3,366,444
PROCESS OF PREPARING CALCIUM FLUORIDE

John M. Laferty, Jr., and Stanley M. Poss, Towanda, Pa., assignors to Sylvania Electric Products Inc., a corporation of Delaware
No Drawing. Filed Apr. 12, 1965, Ser. No. 447,562
4 Claims. (Cl. 23—88)

This invention relates to the manufacture of raw materials for fluorescent phosphors and particularly to a method of manufacturing calcium fluoride of high purity. Calcium fluoride is a known compound and has been made by a variety of methods in the past. Commercially available material, even of reagent grade, has contained certain impurities, such as, oxygen containing compounds which have tended to make it less desirable for phosphor manufacture.

The main end use for calcium fluoride in phosphor manufacture is calcium halophosphate, a well known and widely used phosphor. When the commercially available calcium fluoride was used as a raw material for its preparation, the lumen output of the phosphor when incorporated into lamps was not as great as attained when the calcium fluoride of our invention was used. Substitution of the new calcium fluoride in the phosphor raw materials blend and subsequent incorporation into the calcium halophosphate lattice does not appreciably shift the normal excitation or emission spectrum of the phosphor when incorporated into lamps, but the lumen maintenance is improved upon extended burning.

According to our invention, we mix 0.17 to 0.70 mole of ammonium bifluoride dissolved in 0.07 to 0.30 mole of ammonium hydroxide and then mix with calcium fluoride; the ratio of the number of fluoride atoms to total number of calcium atoms being between about 2.00 to 2.50. The resultant slurry is then air-fired at a temperature between about 800 to 1800° F. for a sufficient time, generally greater than one hour, to decompose the ammonium fluoride and react with any oxygen bearing compounds present in the calcium bifluoride as CaO, Ca(OH)$_2$ or CaCO$_3$.

Accordingly, the primary object of our invention is the manufacture of pure calcium fluoride.

Another object of our invention is the removal of oxygen from calcium fluoride.

An advantage of our invention is that when the calcium fluoride prepared according to our invention is incorporated into a calcium halophosphate lattice, the lumen maintenance of the phosphor over life is improved.

The many objects, features and advantages of our invention will become manifested to those conversant with the art upon reading the following specification wherein specific embodiments of our invention are described by way of illustrative examples.

The specially treated calcium fluoride is prepared by mixing 10 to 40 grams of ammonium bifluoride dissolved in 10 to 40 milliliters of 28% ammonium hydroxide per pound of calcium fluoride used. The slurry is air-fired in open or closed crucibles at a temperature between 800–1800° F. for a period in excess of 1 hour to decompose the ammonium bifluoride and react with any oxygen present in the calcium fluoride as CaO, Ca(OH)$_2$, or CaCO$_3$. We prefer to use 13 grams of ammonium bifluoride and 19 milliliters of 28% ammonium hydroxide per pound of calcium fluoride. The raw material are air-fired for 2 hours at 1200° in open crucibles.

Chemical analysis shows that the percent calcium, fluorine, ignition loss and assay are changed by the above-mentioned treatment. The data are given in the table below:

TABLE I

|  | Percent Fluorine | Percent Calcium | Percent Ignition Loss |
|---|---|---|---|
| Lot I: |  |  |  |
| Control | 47.0 | 50.5 | .8 |
| Treated | 47.6 | 50.4 | .76 |
| Lot II: |  |  |  |
| Control | 47.2 | 50.3 | .63 |
| Treated | 48.4 | 50.8 | .57 |
| Lot III: |  |  |  |
| Control |  |  | .70 |
| Treated |  |  | .29 |

The resultant material is then intimately mixed with the rest of the halophosphate forming raw materials by the usual operations, while luminescence is effectively developed by air-firing in closed crucibles or by nitrogen-firing in open crucibles. As a typical raw material composition for a calcium halophosphate phosphor we cite

Example 1

| Material | Gram-moles | Grams | Wt. Percent |
|---|---|---|---|
| CaHPO$_4$ | 2.94 | 4,001.3 | 94.73 |
| CdNH$_4$PO$_4$ | 0.06 | 13.5 | 0.32 |
| CaCO$_3$ | 1.35 | 135.1 | 3.20 |
| CaF$_2$ | 0.40 | 3.12 | 0.74 |
| NH$_4$Cl | 0.30 | 16.0 | 0.38 |
| MnCO$_3$ | 0.08 | 9.2 | 0.22 |
| Sb$_2$O$_3$ | 0.06 | 17.5 | 0.41 |
|  |  | 4,223.8 | 100.00 |

The ingredients in appetite proportions are intimately blended and air-fired in close crucibles at about 1130° C., or nitrogen-fired in open crucibles in a heated silica tube at about 1260° C. The resultant phosphors are given the usual post-firing treatment.

TABLE II.—EFFECTS OF CALCIUM FLUORIDE MODIFICATIONS ON LAMP BRIGHTNESS FOR A WHITE LIGHT EMITTING CALCIUM HALOPHOSPHATE PHOSPHOR

| Sample No. | Color Coordinates | | LPW vs. Control | | |
|---|---|---|---|---|---|
|  | X | Y | 0 Hr. | 100 Hr. | 500 Hr. |
| Series No. 1: |  |  |  |  |  |
| Control | .383 | .389 | 80.3 | 77.9 | 75.4 |
| Treated | .383 | .389 | 81.4 | 79.0 | 76.4 |
| Series No. 2: |  |  |  |  |  |
| Control | .385 | .386 | 80.0 | 76.7 | 76.0 |
| Treated | .387 | .386 | 81.2 | 78.0 | 77.3 |
| Series No. 3: |  |  |  |  |  |
| Control | .378 | .386 | 78.6 | 77.7 |  |
| Treated | .384 | .388 | 79.2 | 78.1 |  |
| Series No. 4: |  |  |  |  |  |
| Control | .384 | .389 | 79.3 | 77.7 |  |
| Treated | .384 | .393 | 78.1 | 79.2 |  |
| Series No. 5: |  |  |  |  |  |
| Control | .374 | .386 | 78.7 | 76.3 |  |
| Treated | .374 | .386 | 79.9 | 77.1 |  |

It is obvious that the specially prepared calcium fluoride affects substantial increases in lamp brightness. These observations, plus the fact that excitation-emission measurement show no appreciable shift in spectra with the calcium fluoride modification in the phosphor produces substantial new and unexpected results.

Although we have shown particular embodiments of our invention, many modifications and changes may be made. Therefore, it is our intention to be limited only by the spirit and scope of the appended claims.

As our invention, we claim:

1. A process for preparing calcium fluoride, the steps which comprises: dissolving ammonium bifluoride ammonium hydroxide; mixing the solution with calcium fluoride containing oxygen-bearing calcium compound impurities; firing the resultant slurry to decompose the ammonium bifluoride and recovering a purified calcium fluoride.

2. A process for preparing calcium fluoride, the steps which comprise: dissolving ammonium bifluoride in ammonium hydroxide; mixing the solution with calcium fluoride containing oxygen-bearing calcium compound impurities, the ratio between the number of fluorine atoms to calcium atoms being between about 2.00 to 2.50; firing the resultant slurry at a temperature between about 800 to 1800° F. and recovering a purified calcium fluid.

3. The process according to claim 1 wherein about 0.17 to 0.70 mole of ammonium bifluoride are dissolved in about 0.07 to 0.30 mole of ammonium hydroxide.

4. A process for preparing calcium fluoride, the steps which comprise: dissolving 0.17 to 0.70 mole of ammonium bifluoride in about 0.07 to 0.30 mole of ammonium hydroxide; mixing the solution with calcium fluoride containing oxygen-bearing calcium compound impurities; firing the resultant slurry to decompose the ammonium bifluoride and recovering a purified calcium fluoride.

References Cited

UNITED STATES PATENTS

| | | | |
|---|---|---|---|
| 3,029,134 | 4/1962 | Cardon | 23—153 |
| 3,310,369 | 3/1967 | Peterson | 23—153 |
| 3,316,060 | 4/1967 | Dexter et al. | 23—153 |
| 2,498,186 | 2/1950 | Stockbarger et al. | 23—88 |
| 2,550,173 | 4/1951 | Swinehart et al. | 23—88 |
| 3,005,685 | 10/1961 | Riedl et al. | 23—88 |

MILTON WEISSMAN, *Primary Examiner.*

EDWARD STERN, *Examiner.*